US008266549B2

(12) United States Patent
Han

(10) Patent No.: US 8,266,549 B2
(45) Date of Patent: Sep. 11, 2012

(54) APPARATUS AND METHOD FOR DISPLAYING HIERARCHICAL MENU IN MOBILE COMMUNICATION TERMINAL

(75) Inventor: Jea-Hun Han, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 2554 days.

(21) Appl. No.: 10/844,817

(22) Filed: May 13, 2004

(65) Prior Publication Data

US 2005/0108657 A1     May 19, 2005

(30) Foreign Application Priority Data

Nov. 14, 2003    (KR) ......................... 10-2003-0080617

(51) Int. Cl.
*G06F 3/048*     (2006.01)
*G06F 3/00*      (2006.01)
(52) U.S. Cl. ........ 715/854; 715/810; 715/817; 715/835; 715/853; 715/855
(58) Field of Classification Search .................... 715/810
See application file for complete search history.

(56) References Cited

U.S. PATENT DOCUMENTS

| 5,627,980 | A | * | 5/1997 | Schilit et al. ................... 715/841 |
| 5,677,708 | A | * | 10/1997 | Matthews et al. .............. 345/684 |
| 6,549,219 | B2 | | 4/2003 | Selker ........................... 715/834 |
| 6,618,063 | B1 | * | 9/2003 | Kurtenbach ................... 715/834 |
| 6,812,940 | B2 | * | 11/2004 | Arnold ........................... 715/817 |
| 6,915,492 | B2 | * | 7/2005 | Kurtenbach et al. .......... 715/810 |
| 6,983,424 | B1 | * | 1/2006 | Dutta ............................. 715/800 |
| 7,143,214 | B2 | * | 11/2006 | Hayes et al. ..................... 710/72 |
| 2003/0112279 | A1 | | 6/2003 | Irimajiri |
| 2003/0177444 | A1 | * | 9/2003 | Sunata ........................... 715/513 |
| 2004/0001105 | A1 | * | 1/2004 | Chew et al. ..................... 345/817 |
| 2004/0130578 | A1 | * | 7/2004 | Charney ......................... 345/810 |
| 2004/0233238 | A1 | * | 11/2004 | Lahdesmaki ................. 345/810 |
| 2004/0233239 | A1 | * | 11/2004 | Lahdesmaki ................. 345/810 |
| 2005/0066291 | A1 | * | 3/2005 | Lewak ........................... 715/810 |
| 2005/0114781 | A1 | * | 5/2005 | Brownholtz et al. ......... 715/733 |

FOREIGN PATENT DOCUMENTS

| CN | 1398366 | 2/2003 |
| JP | 61-062128 | 3/1986 |
| JP | 03-041558 | 2/1991 |
| JP | 11-095968 | 4/1999 |
| JP | 2000-010702 | 1/2000 |
| JP | 2000-284879 | 10/2000 |
| KR | 1020020039742 | 5/2002 |
| WO | WO0246900 | 6/2002 |

* cited by examiner

*Primary Examiner* — Nicholas Augustine
(74) *Attorney, Agent, or Firm* — The Farrell Law Firm, P.C.

(57) ABSTRACT

An apparatus and method for displaying menu items of a hierarchical menu on a screen in such a manner that a function desired by a user can be traced and performed with a minimum number of key inputs. The top-level menu and bottom-level menu of the hierarchical menu can be simultaneously displayed in one screen picture, thereby enabling a user to reach from an upper-level menu to the bottom-level menu or from the bottom-level menu to the top-level menu with a minimum number of key inputs without passing through intermediate-level menus. Further, a certain menu can be displayed in one screen picture along with the one-level upper menu and one-level lower menu thereof or the one-level lower menu thereof so that the user can readily recognize the position of a current menu. Furthermore, the user can access all menus using only direction keys.

37 Claims, 11 Drawing Sheets

APPARATUS AND METHOD FOR DISPLAYING HIERARCHICAL MENU IN MOBILE COMMUNICATION TERMINAL

PRIORITY

This application claims priority to an application entitled "APPARATUS AND METHOD FOR DISPLAYING HIERARCHICAL MENU IN MOBILE COMMUNICATION TERMINAL", filed in the Korean Intellectual Property Office on Nov. 14, 2003 and assigned Serial No. 2003-80617, the contents of which are hereby incorporated by reference.

BACKGROUND OF THE INVENTION

1. Field of the Invention

The present invention relates to an apparatus and method for displaying menu items in an electronic device, and more particularly to an apparatus and method for displaying hierarchical menu items on a display screen in such a manner that a function desired by a user can be traced and performed with a minimum number of key inputs.

2. Description of the Related Art

Although various electronic devices are capable of displaying menu items, a mobile communication terminal will herein be described for illustrative purposes to be a menu display electronic device.

With advances of mobile communication terminals and the associated techniques for its use, a variety of functions have been integrated in the mobile communication terminals in addition to the terminals' own unique communication function, thereby causing function menus to be more diversified and complicated.

FIGS. 1A-C show exemplary display states of menus on the screen of a general mobile communication terminal. FIG. 1A shows an example of a display state of six menu items belonging to one parent menu, on the full screen. In this example, a cursor slot Cu is located at the menu item 'INTERNET'.

FIG. 1B shows three menu items belonging to one parent menu, displayed on the lower half of the screen. Characters indicating that the cursor slot is located on the 'PHONE BOOK' menu item are displayed on the upper half of the screen.

FIG. 1C shows the lower-level menu of the menu item 'PHONE BOOK' this menu is displayed on the screen when a user selects the menu item 'PHONE BOOK' from among the menu items shown in FIG. 1B.

FIG. 2 shows an example of a general hierarchical menu structure. In the hierarchical structure, any one menu has several levels of sub-menus. It is assumed in the present example that the depth of the hierarchical structure is 4. However, it should be noted here that the depth of the hierarchical structure is variable and may be different for any given menu.

The reference numerals 110-140 denote first to fourth levels of menus, respectively, wherein the second-level menu is a sub-menu of the first-level menu, the third-level menu is a sub-menu of the second-level menu, and the fourth-level menu is a sub-menu of the third-level menu.

The relationship between menus and sub-menus can be defined as the relationship between parents and children. That is, the parent menu of a menu item '1.1.1' is a menu item '1.1'. In the specification, the parent menu means a one-level higher menu item of a specific menu item in the hierarchical structure. The child menus of a menu item '1' include the menu item '1.1' and menu items '1.2', '1.3' and '1.4'. In the specification, the child menu means a set of one-level lower menu items of a specific menu item in the hierarchical structure. The brother menus of the menu item '1' includes menu items '2', '3' and '4'. In the specification, the brother menu means a set of menu items having the same parent menu as that of a specific menu item in the hierarchical structure.

The first-level menu 110 is the top-level menu in the hierarchical structure, which is displayed on the screen of the mobile communication terminal when the user pushes a certain button, for example, a left, right, up or down direction key, for menu display on the screen or applies some different corresponding input, for example, through an on-screen picture touch pad. Here, menu items are denoted by numerals 1 to 4 for convenience sake.

The second-level menu 120 is a child menu of the first-level menu 110, which is displayed when the first-level menu 110 is selected. The third-level menu 130 is a child menu of the second-level menu 120, which is displayed when the second-level menu 120 is selected. The fourth-level menu 140 is a bottom-level menu in the hierarchical structure, in which a function desired by the user is executed directly.

However, in a conventional menu system, only menu items belonging to the same menu level are displayed together in one screen picture. For this reason, in order to execute a function corresponding to the bottom-level menu, the user has to repeat his/her direction key (navigation key)/confirm key input operation to trace a corresponding menu item. For example, in order to go from a menu item '1.1.1.1' to menu item '4.4.4.4' in the bottom-level menu in FIG. 2, the user must pass through the menu items '1' and '4' in the top-level menu. In this regard, the conventional menu system has a disadvantage in that too many key operations are required of the user, resulting in degradation in efficiency and inconvenience of use. This system is also disadvantageous in that the user cannot see the upper or lower-level menus of a currently displayed menu.

Moreover, a hot key based user configuration menu is subject to a complex hot key setup process and is low in utilization because most users have a tendency to trace menus using the direction keys in preference to hot keys.

SUMMARY OF THE INVENTION

Therefore, the present invention has been made in view of the above problems, and it is an object of the present invention to provide a menu display apparatus and method wherein a mobile communication terminal user can make a search from an upper-level menu to a bottom-level menu or from the bottom-level menu to a top-level menu with a minimum number of key inputs and without passing through intermediate-level menus.

It is another object of the present invention to provide a menu display apparatus and method wherein a mobile communication terminal user can view the upper- and lower-level menu of a current menu in one screen picture.

It is yet another object of the present invention to provide a menu display apparatus and method wherein a mobile communication terminal user can access all menus using only direction keys.

In accordance with an aspect of the present invention, the above and other objects are accomplished by the provision of a menu display apparatus for an electronic device comprising: at least one direction key for moving menu items displayed on a screen of the electronic device; a first memory for storing a hierarchical user menu; a second memory for storing a menu set containing a plurality of menu items to be displayed in one screen picture; display means for partitioning the screen picture into a plurality of rows and columns and arranging and displaying the menu items of the menu set, respectively, in positions defined by the rows and columns; and control means for locating and displaying selection means in a specific one of the positions defined by a specific one of the rows and a specific one of the columns, fixed in the screen picture by the display means, and creating a new menu set containing menu items belonging to an upper-level menu and lower-level menu of a menu item located in the selection means with reference to the hierarchical user menu in the first memory upon sensing an input of the at least one direction key.

In accordance with another aspect of the present invention, there is provided a menu display method for an electronic device, the electronic device including a memory for storing a hierarchical menu and functioning to partition one screen picture into a plurality of rows and columns and to arrange and display menu items, respectively, in slots of positions defined by the rows and columns, the slots including one cursor slot, the method comprising the steps of: a) determining whether an input of a direction key is sensed; b), if the direction key input is sensed, creating a menu set by performing the steps of: b-1) extracting and storing a specific menu item to be located in the cursor slot with reference to the hierarchical menu; b-2) extracting and storing menu items corresponding to ones of the slots located at the left-hand side and right-hand side of the cursor slot; b-3), if the specific menu item in the cursor slot belongs to a top-level menu, extracting a bottom-level menu of the specific menu item, storing it in a different one of the rows from that where the cursor slot is located, extracting a one-level lower menu of the specific menu item, and storing it in another one of the rows; b-4), if the specific menu item in the cursor slot belongs to a bottom-level menu, extracting a top-level menu of the specific menu item, storing it in the different row, extracting a one-level upper menu of the specific menu item, and storing it in the another row; and b-5), if the specific menu item in the cursor slot belongs to neither the top-level menu nor the bottom-level menu, extracting the one-level upper menu of the specific menu item, storing it in the different row, extracting the one-level lower menu of the specific menu item, and storing it in the another row; and c) displaying the menu set in the screen picture.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1A:
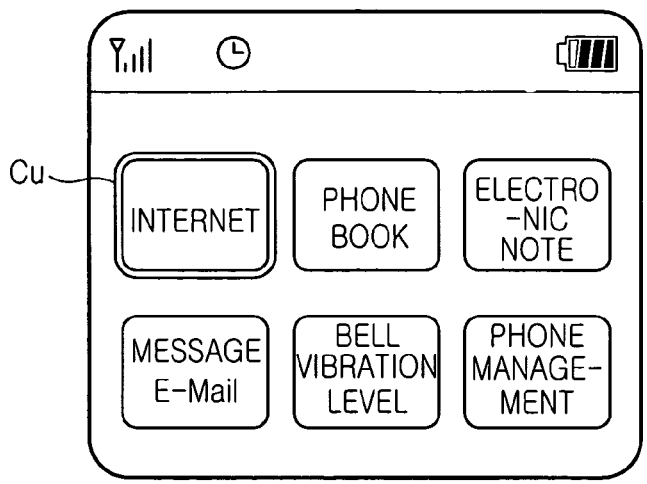
FIGS. 1A to 1C are views showing exemplary display states of menus on the screen of a general mobile communication terminal.
Figure 1B:
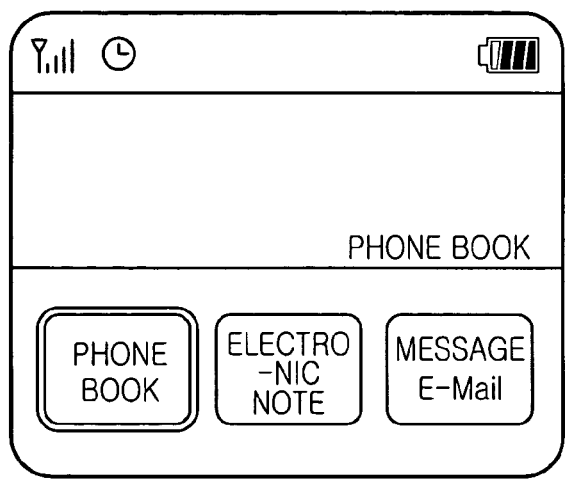
Figure 1C:
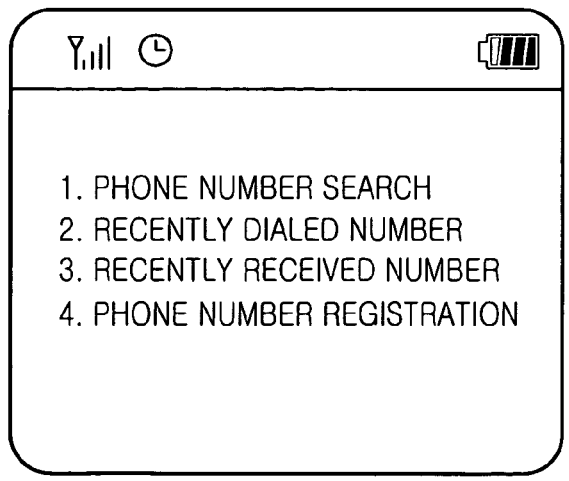

Now, preferred embodiments of the present invention will be described in detail with reference to the annexed drawings. In the drawings, the same or similar elements are denoted by the same reference numerals even though they are depicted in different drawings. In the following description, a variety of specific elements such as constituent elements of various concrete circuits are shown. The description of such elements has been made only for a better understanding of the present invention. Those skilled in the art will appreciate that the present invention can be implemented without using the above-mentioned specific elements. In the following description of the present invention, a detailed description of known functions and configurations incorporated herein will be omitted when it may obscure the subject matter of the present invention.

Figure 3:
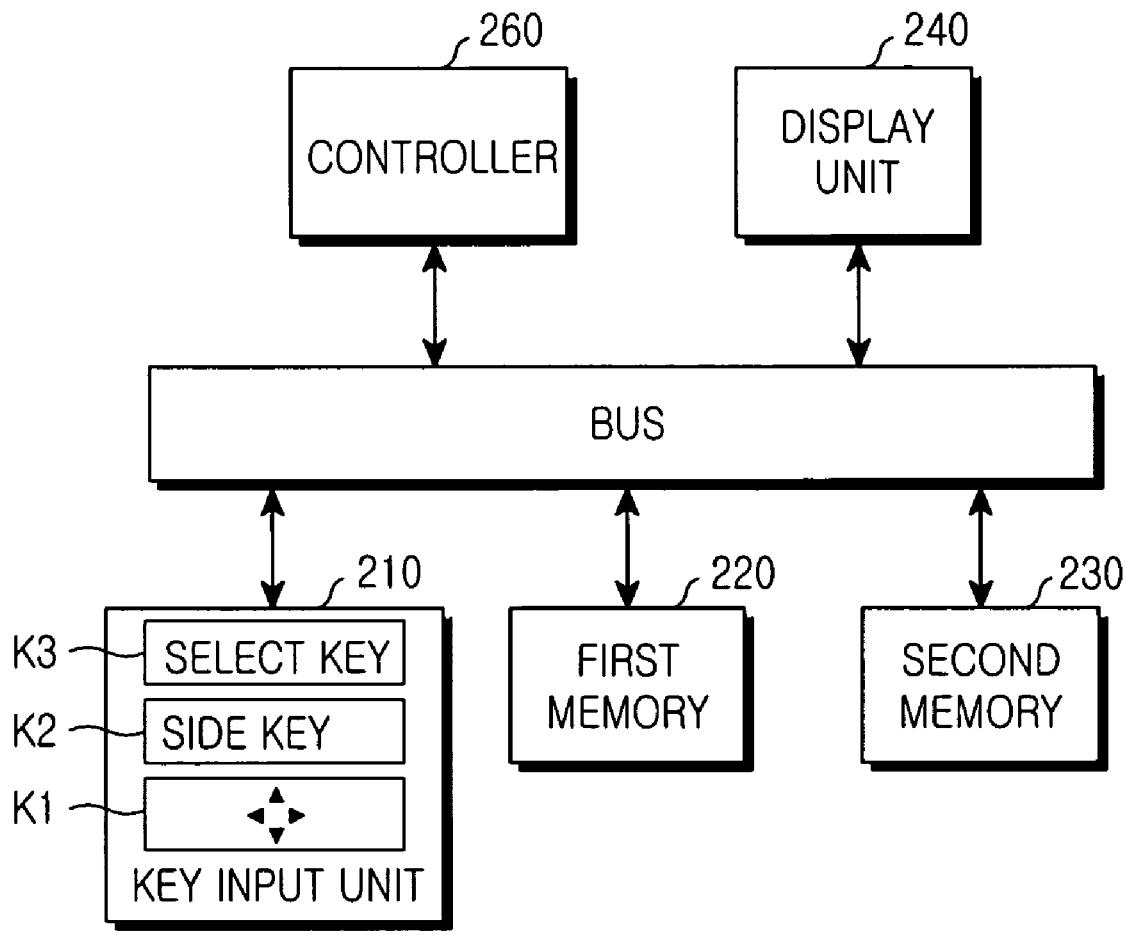
FIG. 3 is a block diagram showing the configuration of a menu display mobile communication terminal according to the present invention.

With reference to FIG. 3, there is shown in block form the configuration of a menu display mobile communication terminal according to the present invention. As shown in FIG. 3, the mobile communication terminal comprises a key input unit 210 including left, right, up and down direction keys for moving menu items displayed on the screen of the terminal on a row or column basis, a select key, a side key and other various keys. A first memory 220 is a database that stores a hierarchical user menu. A second memory 230 is adapted to temporarily store a menu set containing a plurality of menu items to be displayed in one screen picture. The first memory 220 and second memory 230 may be physically or logically separated from each other. A display unit 240 is adapted to partition the screen picture into a plurality of rows and columns and arrange and display the menu items of the menu set, respectively, in positions defined by the rows and columns. A controller 260 is adapted to locate and display selection means in a specific position defined by a specific row and a specific column, fixed in the screen picture by the display unit 240, to indicate that only any one of the menu items arranged in the specific position are currently selectable. The controller 260 is also adapted, upon sensing an input of at least one of the direction keys with reference to the hierarchical user menu in the first memory 220, to recognize a specific menu item to be located in the selection means extract menu items one-to-one corresponding to the remaining positions (rows and columns) from the upper-level menu and lower-level menu of the specific menu item and create a new menu set containing the extracted menu items, except for the specific position of the selection means.

Where the specific menu item in the selection means belongs to a bottom-level menu, its top-level menu is displayed in a row beneath the selection means. Alternatively, where the specific menu item in the selection means belongs to a top-level menu, its bottom-level menu is displayed in a row above the selection means.

The menu items one-to-one correspond to respective slots of an n×m matrix, and the selection means can be implemented by a specific cursor slot. Here, n and m are natural numbers that are greater than or equal to 3, embodiments wherein n×m is assumed to be 3×3 are incorporated herein.

The display unit 240 may display one screen picture while dividing it into a first part and a second part. The cursor slot is movable between the first part and the second part, but fixed in a corresponding position of the first or second part. The second part is composed of a single row arranged to display the bottom-level menu of a menu item in the cursor slot when the cursor slot is located in the first part.

Figure 4A:
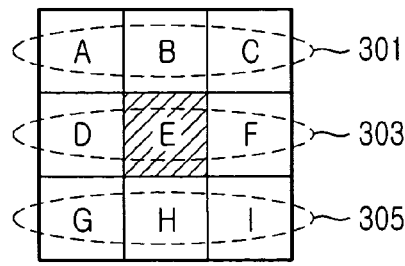
FIG. 4A is a diagram of a positioning reference of menu arrangement necessary for description of a menu display method according to a first embodiment of the present invention.

FIG. 4A shows a positioning reference of menu arrangement necessary for description of a menu display method according to a first embodiment of the present invention. In FIG. 4A, a 3×3 square area contains nine menu items displayed in one screen picture, and will hereinafter be referred to as a 'menu set' for the convenience of description. The reference characters A, B, . . . , I represent positions of the screen picture where the corresponding menu items are respectively arranged. The cursor slot is fixed in the central position E. For this reason, in order to select a desired menu item, the user has to move the item to the central position E where the cursor slot is located.

An upper-level menu is arranged in a row 301 above a row 303 where the cursor slot is located, and a lower-level menu is arranged in a row 305 beneath the row 303. Namely, a menu item located in B belongs to the upper-level menu of a menu item located in E, and a menu item located in H belongs to the lower-level menu of the menu item located in E. Menu items located in A and C belong to a brother menu of the menu item located in B, menu items located in D and F belong to a brother menu of the menu item located in E, and menu items located in G and I belong to a brother menu of the menu item located in H.

Figure 2:
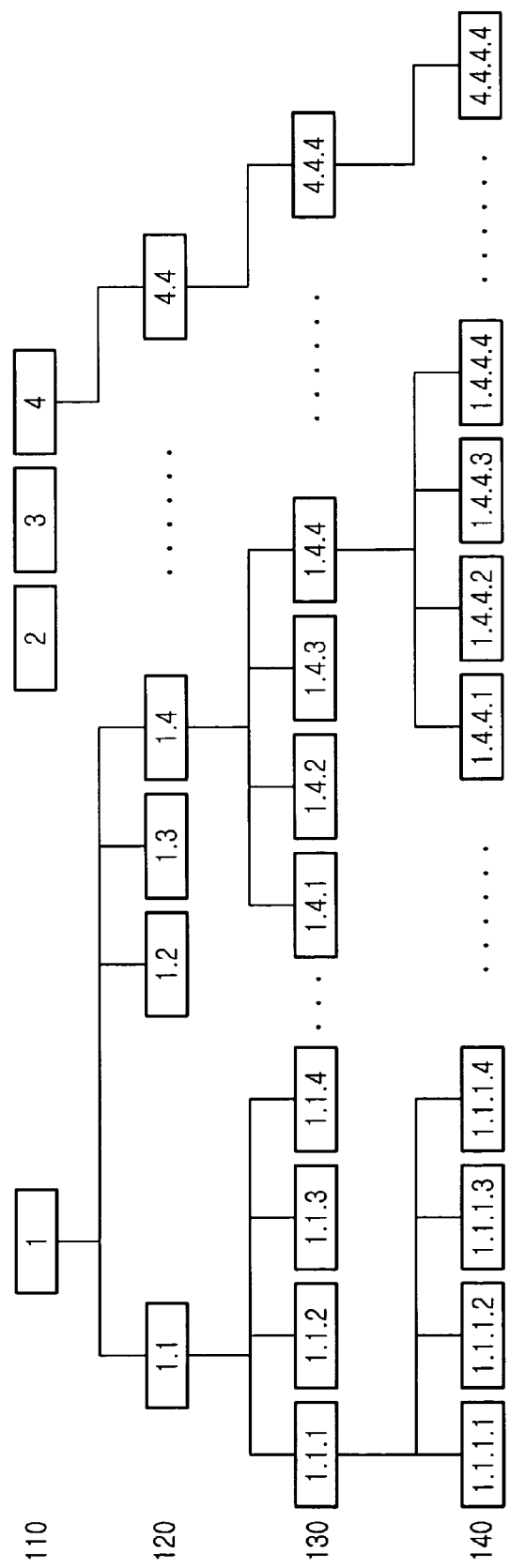
FIG. 2 is a view showing an example of a general hierarchical menu structure.

A one-level upper menu of the menu item located in the cursor slot E is displayed in the first row 301. As a result, in the case where, for example, a top-level menu (110 in FIG. 2 is displayed in the second row 303, a bottom-level menu 140 in FIG. 2 is displayed in the first row 301. Also, a child menu of the menu item in the cursor slot E is displayed in the third row 305. As a result, in the case where, for example, a bottom-level menu (140 in FIG. 2 is displayed in the second row 303, a top-level menu 110 in FIG. 2 is displayed in the third row 305.

Figure 4B:
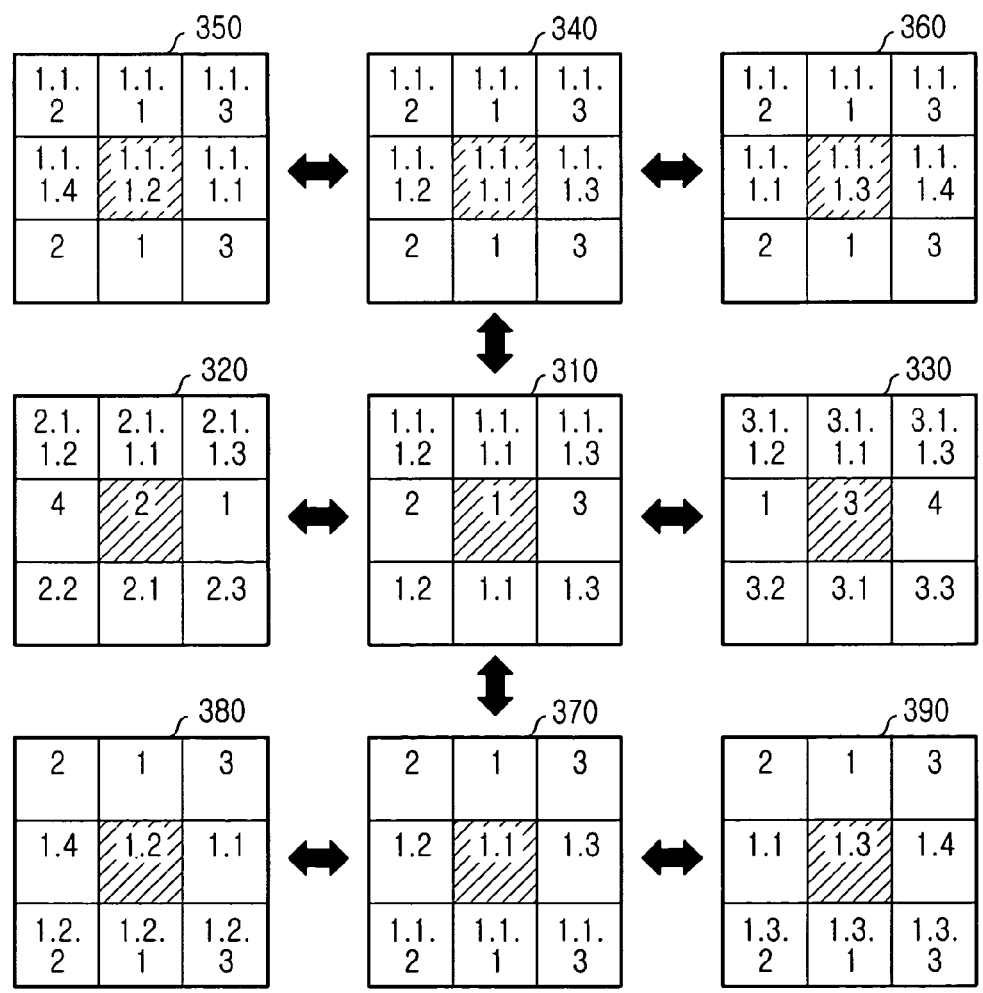
FIG. 4B is a diagram of the menu display method according to the first embodiment of the present invention.

FIG. 4B illustrates the menu display method according to the first embodiment of the present invention. In FIG. 4B, arrows between menu sets mean direction key inputs. The menu sets shown in this drawing are created on the basis of the hierarchical structure described above with reference to FIG. 2. It is assumed that, in FIG. 2, a highest priority is assigned to the menu item '1' and lower priorities are assigned to the menu items '2', '3' and '4' in the order of ascending numbers.

According to the first embodiment, the user can move from, for example, a top-level menu (110 in FIG. 2) to a bottom-level menu, 140 in FIG. 2 with one key input. The user can also make a backward search from a lower-level menu to an upper-level menu, as well as a forward search from the upper-level menu to the lower-level menu. Furthermore, the user can access all desired menus through the use of only the direction keys in a different manner from the conventional menu selection system wherein he/she cannot help repeating his/her direction key/confirm key input operation.

A detailed description will hereinafter be given of the respective menu sets.

MENU SET 310: The menu set 310 is displayed as an initial screen picture when the user pushes a menu button or a corresponding button for menu selection. In the menu set 310, the first-level menu 110 shown in FIG. 2 is displayed in the second row, in which a first-priority menu item in the first-level menu is displayed in the cursor slot E and a second-priority menu item and third-priority menu item in the first-level menu are displayed in slots located at the left-hand side and right-hand side of the cursor slot E, respectively. In the third row, a child menu of the menu item displayed in the cursor slot E, in the second-level menu 120, is displayed according to priorities therein.

Because the top-level menu is displayed in the second row, the bottom-level menu is displayed in the first row. Also, a first-priority menu item in the bottom-level menu of the menu item displayed in the cursor slot E is displayed in the second column B of the first row, and a second-priority menu item and third-priority menu item in the bottom-level menu are displayed in slots located at the left-hand side and right-hand side of the second column B of the first row, respectively. At this time, the bottom-level menu of the menu item in the cursor slot E can be obtained by making a forward search along the hierarchical structure beginning with the menu item in the cursor slot E on the basis of priorities defined in the respective menu levels. For example, assuming that priorities in each menu level in FIG. 2 are defined to be 1>2>3>4, the bottom-level menu item of the menu item '1' in the top-level menu 110 is '1.1.1.1' and the bottom-level menu 140 of the menu item '1' includes the menu item '1.1.1.1' and menu items '1.1.1.2', '1.1.1.3' and '1.1.1.4'.

MENU SET 320: The menu set 320 is displayed on the screen when the user enters the left direction key under the condition that the menu set 310 is displayed. The menu item in the cursor slot E is changed from '1' to '2', menu items '2.1.1.1', '2.1.1.2' and '2.1.1.3' in the bottom-level menu of the menu item '2' are displayed in the first row, and menu items '2.1', '2.2' and '2.3' belonging to a child menu of the menu item '2' are displayed in the third row. At this time, the menu items 1, 2, 3 and 4 forms a ring-shaped menu structure with its start and end portions connected with each other. That is, when the left or right direction key is successively entered, the menu items are circularly displayed, for example, in the order of 4-2-1-3-4-2-1-3. This is applicable to all other rows according to the present invention, as well as the second row.

MENU SET 340: The menu set 340 is displayed on the screen when the user enters the up direction key under the condition that the menu set 310 is displayed. The menu item in the cursor slot E is changed from '1' to '1.1.1.1' located in the second column B of the first row of the menu set 310, so menu items '1.1.1', '1.1.2' and '1.1.3' in the one-level upper menu 130 of the menu item '1.1.1.1' are displayed in the first row, and menu items '1', '2' and '3' belonging to the top-level menu 110 of the menu item '1.1.1.1' are displayed in the third row because the menu item '1.1.1.1' belongs to the bottom-level menu 140.

MENU SETS 350 AND 360: The menu set 350 is displayed on the screen when the user enters the left direction key under the condition that the menu set 340 is displayed, and the menu set 360 is displayed on the screen when the user enters the right direction key under the same condition. The menu item in the cursor slot E of the second row is changed from '1.1.1.1' to '1.1.1.2' and '1.1.1.3', respectively, but there is no change in the third and first rows since the menu items '1.1.1.2' and '1.1.1.3' have the same one-level upper menu 130 and top-level menu 110 as those of the menu item '1.1.1.1'.

MENU SET 370: The menu set 370 is displayed on the screen when the user enters the down direction key under the condition that the menu set 310 is displayed. The menu item in the cursor slot E is changed from '1' to '1.1' located in the second column H of the third row of the menu set 310, so menu items '1', '2' and '3' in the one-level upper menu, or top-level menu 110, of the menu item '1.1' are displayed in the first row, and menu items '1.1.1', '1.1.2' and '1.1.3' belonging to the child menu 130 of the menu item '1.1' are displayed in the third row.

MENU SETS 380 AND 390: The menu set 380 is displayed on the screen when the user enters the left direction key under the condition that the menu set 370 is displayed, and the menu set 390 is displayed on the screen when the user enters the right direction key under the same condition. There is no change in the first row since the menu items '1.1', '1.2' and '1.3' in the second row have the same one-level upper menu, but a child menu of the menu item in the cursor slot E of each of the menu sets 380 and 390 is displayed in the third row.

In order to execute a desired menu item, the user must position it in the cursor slot E and push a predefined execution key. At this time, the desired menu item has to belong to a bottom-level menu. The execution key acts as the down direction key when being pushed under the condition that a menu item positioned in the cursor slot E does not belong to the bottom-level menu.

Figure 5:
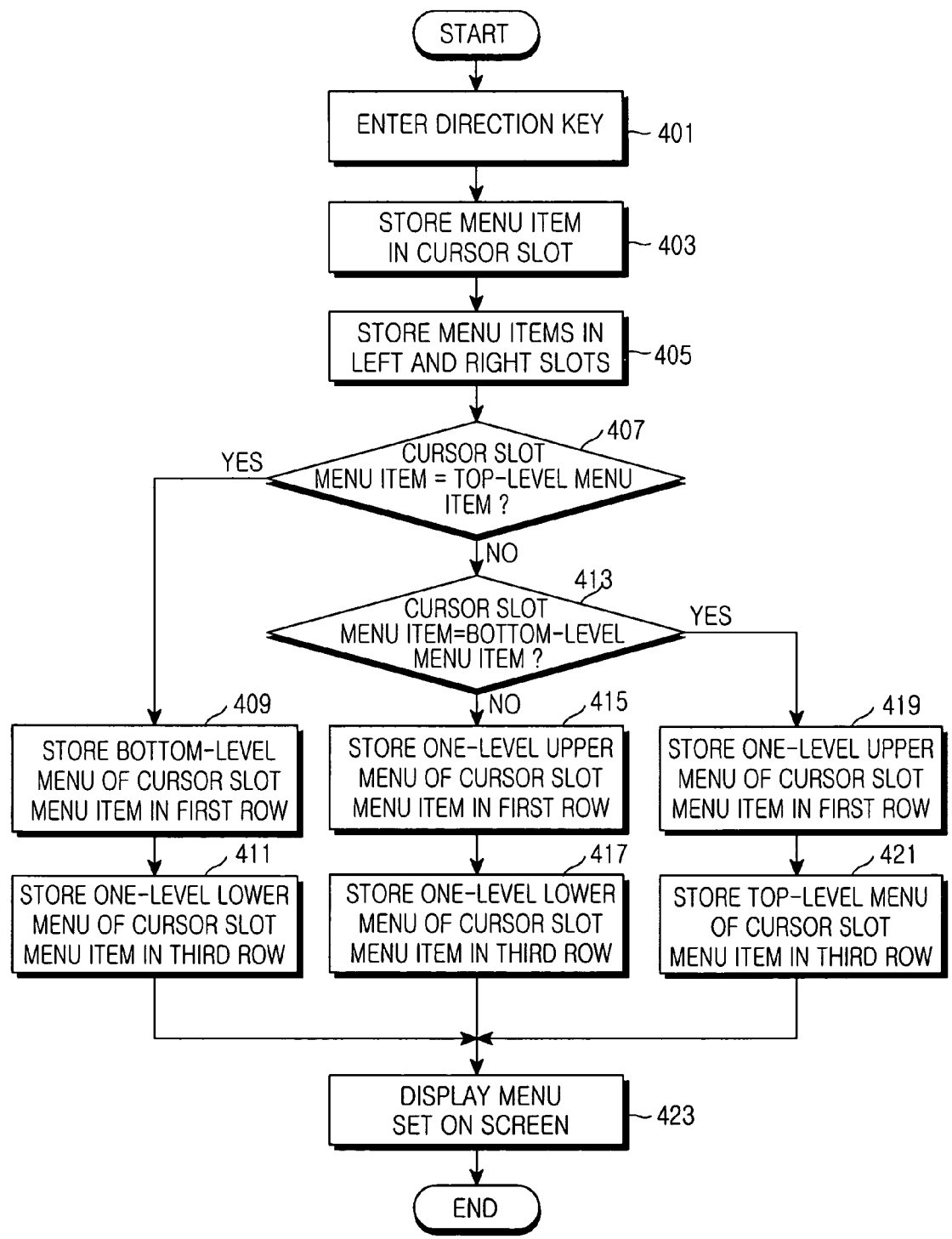
FIG. 5 is a flow chart illustrating a menu display control operation according to the first embodiment of the present invention.

FIG. 5 is a flow chart illustrating a menu display control operation according to the first embodiment of the present invention. First, the controller 260 (FIG. 3) determines the type of a key entered by the user at step 401 and then proceeds to step 403, in which it is determined whether a menu item is to be entered into the cursor slot E. If the entered key is determined to be the up direction key at step 401, the controller 260 stores a menu item of the upper slot B prior to the key input in the cursor slot E. If the entered key is the down direction key, the controller 260 stores a menu item of the lower slot H in the cursor slot E. The controller 260 stores a menu item of the left slot D in the cursor slot E if the entered key is the left direction key and a menu item of the right slot F in the cursor slot E if the entered key is the right direction key, and then proceeds to step 405.

Menu items are stored in the slots located at the left-hand side and right-hand side of the cursor slot E at step 405. The controller 260 stores menu items in a brother menu of a menu item in the cursor slot E in the left and right slots and then proceeds to step 407.

The controller 260 determines at step 407 whether the menu item in the cursor slot E belongs to the top-level menu 110. The controller 260 then proceeds to step 409 if the menu item in the cursor slot E belongs to the top-level menu 110 and to step 413 if it does not.

The controller 260 determines and stores a menu of the first row 301 at step 409. Since the menu item in the cursor slot E belongs to the top-level menu 110, the controller 260 stores the bottom-level menu 140 of that menu item in the first row and then proceeds to step 411.

The controller 260 determines and stores a menu of the third row 305 at step 411. Since the menu item in the cursor slot E belongs to the top-level menu 110, the controller 260 stores the one-level lower menu 120 of that menu item in the third row and then proceeds to step 423.

At step 413, the controller 260 determines whether the menu item in the cursor slot E belongs to the bottom-level menu 140. The controller 260 then proceeds to step 419 if the menu item in the cursor slot E belongs to the bottom-level menu 140 and to step 415 if it does not.

The controller 260 determines and stores a menu of the first row 301 at step 419. Since the menu item in the cursor slot E belongs to the bottom-level menu 140, the controller 260 stores the one-level upper menu of that menu item in the first row and then proceeds to step 421.

The controller 260 determines and stores a menu of the third row 305 at step 421. Since the menu item in the cursor slot E belongs to the bottom-level menu 140, the controller 260 stores the top-level menu 110 of that menu item in the third row and then proceeds to step 423.

At step 415, the controller 260 determines and stores a menu of the first row 301. Because the menu item in the cursor slot E belongs to neither the bottom-level menu 140 nor the top-level menu 110, the controller 260 stores the one-level upper menu of that menu item in the first row and then proceeds to step 417.

At step 417, the controller 260 determines and stores a menu of the third row 305. Because the menu item in the cursor slot E belongs to neither the bottom-level menu 140 nor the top-level menu 110, the controller 260 stores the one-level lower menu of that menu item in the third row and then proceeds to step 423.

It should be noted here that in processing menus in the remaining rows and columns except for the cursor slot E, it is possible to change the processing order or process the menus at the same time.

At step 423, the controller 260 displays a menu set created through the above steps 401 to 421 on the screen.

Although the menu display control operation according to the first embodiment of the present invention has been disclosed to include the above step 423 of displaying the menu set on the screen after configuring it completely, it may display a determined menu item on the screen at each step without processing the above step 423.

Figure 6A:
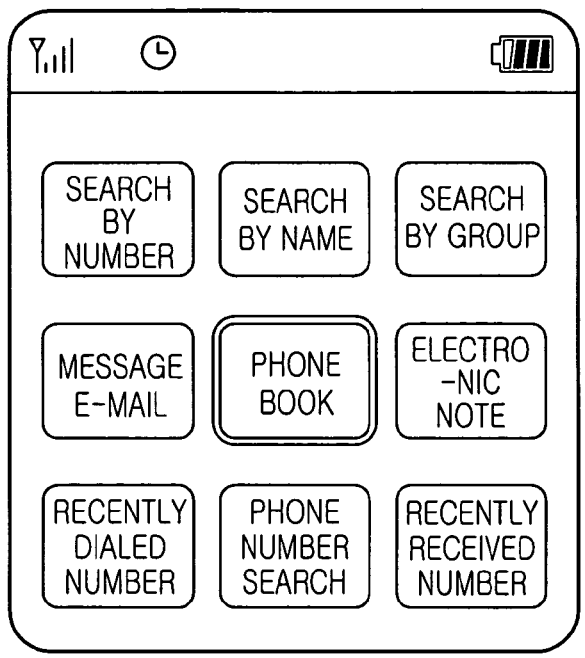
FIGS. 6A and 6B are diagrams of display states of menus on the screen of the mobile communication terminal according to the first embodiment of the present invention.
Figure 6B:
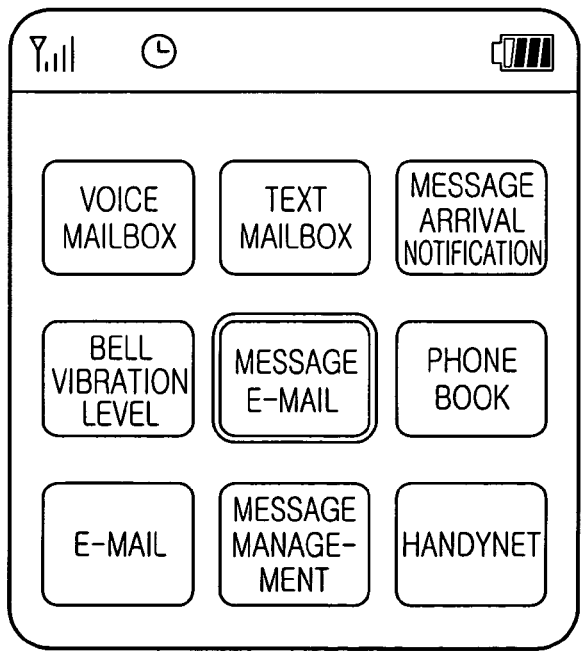

FIGS. 6A and 6B show display states of menus on the screen of the mobile communication terminal according to the first embodiment of the present invention.

Figure 7A:
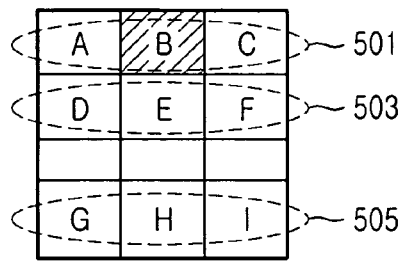
FIG. 7A is a diagram of a positioning reference of menu arrangement necessary for description of a menu display method according to a second embodiment of the present invention.

FIG. 7A shows a positioning reference of menu arrangement necessary for description of a menu display method according to a second embodiment of the present invention. In FIG. 7A, a square area with a 2×3 rectangular area and 1×3 rectangular area contains nine menu items displayed in one screen picture, and will also be referred to hereinafter as a 'menu set' for the convenience of description.

The reference characters A, B, . . . , I represent positions of the screen picture where the corresponding menu items are arranged, respectively. The cursor slot is fixed in the central position B of the first row. For this reason, in order to select a desired menu item, the user has to move it to the central position B where the cursor slot is located.

According to the second embodiment, for example, the bottom-level menu 140 in FIG. 2 of an upper-level menu is always displayed in a specific area of the menu picture so that the user can see the displayed bottom-level menu and reach the bottom-level menu with one key input while omitting a procedure of entering intermediate keys up to the bottom-level menu. The user can also make a backward search from a lower-level menu to an upper-level menu, as well as a forward search from the upper-level menu to the lower-level menu. Furthermore, the user can access all desired menus through the use of only the direction keys in a different manner from the conventional menu selection system wherein he/she cannot help repeating the direction key/confirm key input operation.

Figure 7B:
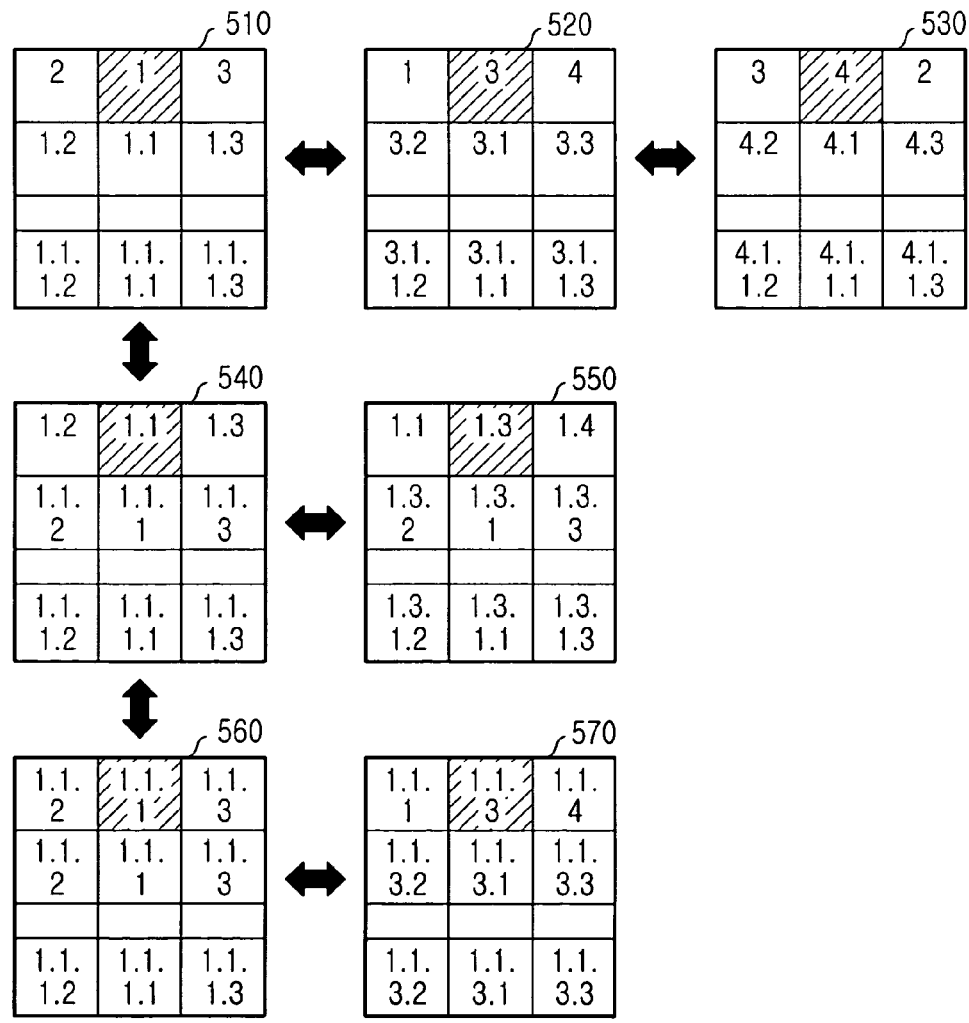
FIG. 7B is a diagram of the menu display method according to the second embodiment of the present invention.

FIG. 7B illustrates the menu display method according to the second embodiment of the present invention. In FIG. 7B, arrows between menu sets mean direction key inputs. The menu sets shown in this drawing are created on the basis of the hierarchical structure described above with reference to FIG. 2. It is assumed that, in FIG. 2, a highest priority is assigned to the menu item '1' and lower priorities are assigned to the menu items '2', '3' and '4' in the order of ascending numbers.

The child menu, or one-level lower menu, of a menu item in the cursor slot B is displayed in the second row 503. Also, in the case where the bottom-level menu 140 is displayed in the first row 501, the top-level menu 110 is displayed in the second row 503. The bottom-level menu 140 of the menu item in the cursor slot B is always displayed in the third row 505. If the control operation moves to the third row 505 according to an input of a predefined key, the user can execute a desired function using the left and right direction keys and the select key and then return the control operation to the first row 501 using the predefined key. Further, each row has a ring-shaped menu structure as described previously in the first embodiment.

A detailed description will hereinafter be given of the respective menu sets.

MENU SET 510: The menu set 510 is displayed as an initial screen picture when the user pushes a menu button or a corresponding button for menu selection. In the menu set 510, the first-level menu 110 is displayed in the first row 501, in which a first-priority menu item in the first-level menu is displayed in the cursor slot B, a second-priority menu item therein is displayed in the left slot and a third-priority menu item therein is displayed in the right slot. In the second row 503, a child menu of the menu item displayed in the cursor slot B, in the second-level menu 120, is displayed according to priorities therein. Displayed in the third row 505 is the bottom-level menu 140 of the menu item displayed in the cursor slot B of the first row 501.

MENU SETS 520 AND 530: The menu set 520 is displayed on the screen when the user enters the right direction key one time under the condition that the menu set 510 is displayed, and the menu set 530 is displayed on the screen when the user enters the right direction key two times under the same condition. The menu item in the cursor slot B of the first row 501 is changed from '1' to '3' and '4', respectively, so a child menu thereof is displayed in the second row 503 and the bottom-level menu 140 thereof is displayed in the third row 505.

MENU SET 540: The menu set 540 is displayed on the screen when the user enters the down direction key under the condition that the menu set 510 is displayed. The menu item '1.1' in the second column E of the second row of the menu set 510 is changed to the cursor slot B in position, so a child menu thereof is displayed in the second row 503. However, there is no change in the third row 505 since the menu items '1' and '1.1' have the same bottom-level menu 140.

MENU SET 560: The menu set 560 is displayed on the screen when the user enters the down direction key under the condition that the menu set 540 is displayed. The menu item '1.1.1' in the second column E of the second row of the menu set 540 is changed to the cursor slot B in position, so a child menu thereof is displayed in the second row 503. However, there is no change in the third row 505 since the menu items '1.1' and '1.1.1' have the same bottom-level menu 140. Further, in the menu set 560, the same menus are displayed in the second row 503 and third row 505 since the child menu of the menu item '1.1.1' in the cursor slot B is the same as the bottom-level menu 140 thereof.

Figure 8:
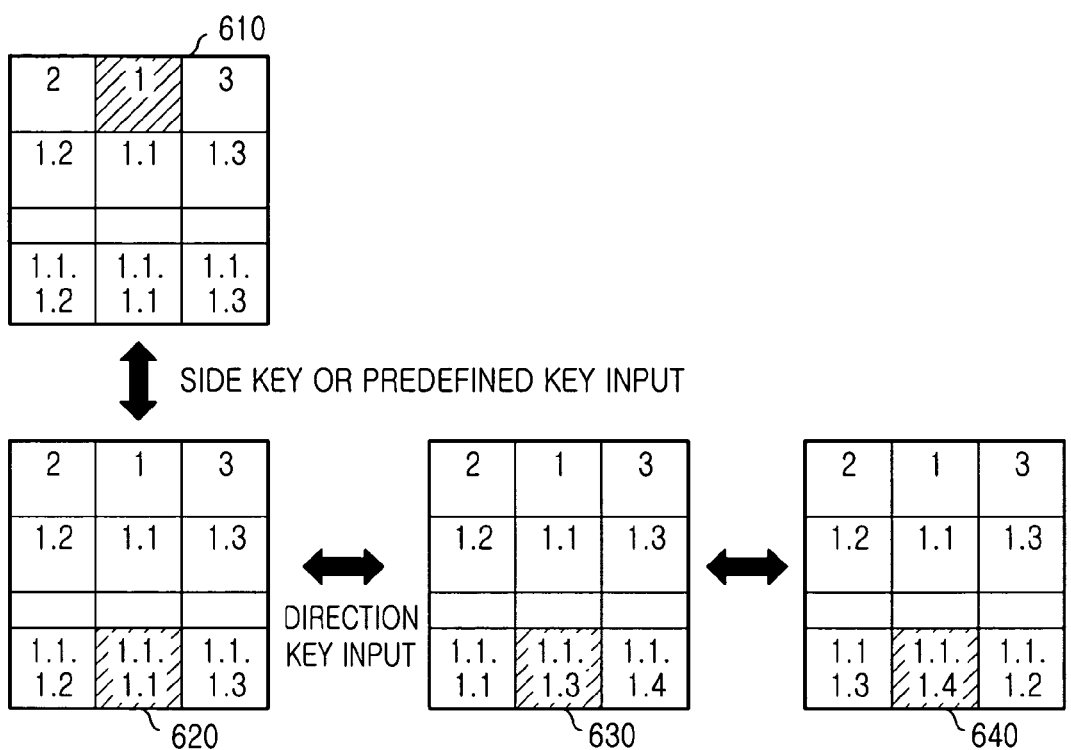
FIG. 8 is a diagram of a procedure of executing a menu item desired by a user according to the second embodiment of the present invention.

FIG. 8 is a view illustrating a procedure of executing a menu item desired by the user according to the second embodiment of the present invention MENU SET 610: The menu set 610 is displayed as an initial screen picture when the user pushes a menu button or a corresponding button. At this time, the user positions any one of the upper-level menu items of a menu item to be executed in the cursor slot B using at least one of the direction keys and then moves the control operation to the third row 505 by entering the side key or a predefined key.

MENU SETS 620, 630 AND 640: These menu sets represent various states of the control operation moved to the third row 505 under the condition that the menu set 610 is displayed. In these states, the user can select a desired menu item by scrolling on the third row 505 using the left or right direction key and execute a corresponding function by pushing the execution button. At this time, there is no change in the rows other than the third row 505.

Figure 9:
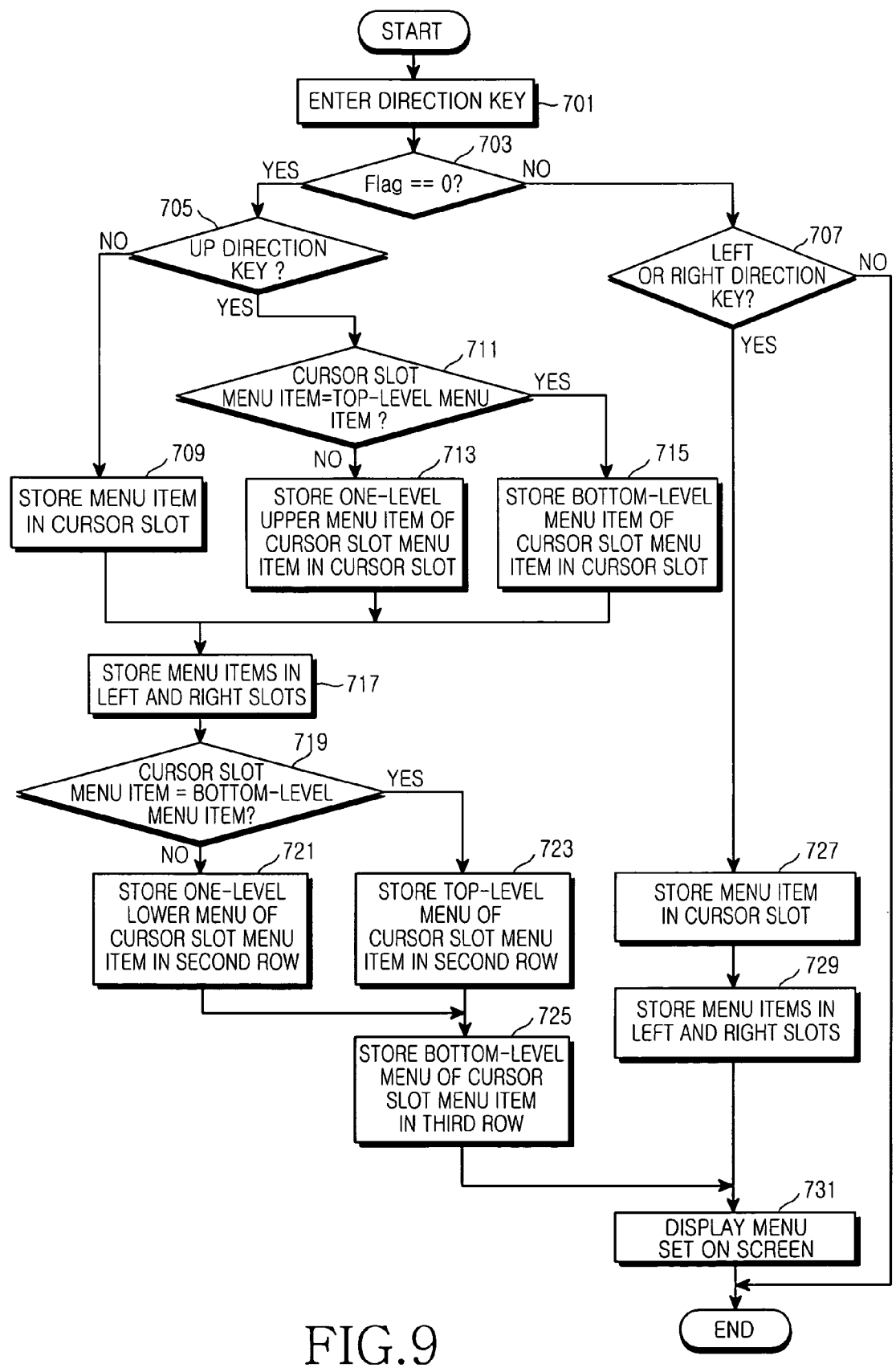
FIG. 9 is a flow chart illustrating a menu display control operation according to the second embodiment of the present invention.

FIG. 9 is a flow chart illustrating a menu display control operation according to the second embodiment of the present invention. In step 701, the controller 260 senses an input of a direction key.

In step 703, the controller 260 determines which one of the first row 501 and third row 505 the cursor slot is currently present. A flag has a value of 0 or 1. The flag is changed in value when the user enters a predefined key to change the position of the cursor slot. The flag is 0 when the cursor slot is present in the first row 501 and 1 when it is present in the third row 505. The controller 260 proceeds to step 705 if the flag is 0 and step 707 if it is 1.

In step 705, the controller 260 determines the type of a key entered by the user when the cursor slot is present in the first row 501 and then proceeds to step 709.

If the entered key is not the up direction key in step 705, a menu item to be entered into the cursor slot B is determined in step 709. If the entered key is determined to be the down direction key, the controller 260 stores a menu item of the lower slot E in the cursor slot B. The controller 260 stores a menu item of the left slot A in the cursor slot B if the entered key is the left direction key and a menu item of the right slot C in the cursor slot B if the entered key is the right direction key, and then proceeds to step 717.

In step 711, if the entered key is a up direction key in step 705, the controller 260 determines whether the existing menu item of the cursor slot B belongs to the top-level menu 110.

In step 713, the controller 260 stores a parent menu item of the existing menu item of the cursor slot B in the cursor slot B if the cursor slot B does not belong to the top-level menu in step 711 and then proceeds to step 717.

In step 715, if the cursor slot B belongs to a top-level menu in step 711, the controller 260 stores the bottom-level menu item of the existing menu item of the cursor slot B in the cursor slot B.

Menu items are then stored in the slots located at the left-hand side and right-hand side of the cursor slot B in step 717. The controller 260 stores menu items in a brother menu of a new menu item in the cursor slot B in the left and right slots and then proceeds to step 719.

In step 719, the controller 260 determines whether the new menu item in the cursor slot B belongs to the bottom-level menu 140.

In step 721, if the cursor slot B does not belong to the bottom-level menu 140, the controller 260 stores a child menu of the cursor slot B in the second row 503 and then proceeds to step 725.

In step 723, the controller 260 stores the top-level menu 110 of the new menu item in the cursor slot B in the second row 503 if the new menu item belongs to the bottom-level menu 140 and then proceeds to step 725.

Step 725 is performed to determine and store a menu of the third row 505. The controller 260 stores the bottom-level menu 140 of the new menu item in the cursor slot B in the third row and then proceeds to step 731.

Note that in processing menus in the remaining rows and columns except for the cursor slot B, it is possible to change the processing order or process the menus at the same time.

If the cursor slot is present in the third row 505, the controller 260 moves from step 703 to step 707.

In step 707, the controller 260 determines the type of a key entered by the user, and then proceeds to step 727 if the entered key is the left or right direction key, but if not, the operation is ended.

A menu item to be entered into the cursor slot H is determined at step 727. This determination is made as to two cases, one associated with the left direction and the other associated with the right direction. The controller 260 stores a menu item of the slot G located at the left-hand side of the cursor slot H in the cursor slot H if the entered key is the left direction key and a menu item of the slot I located at the right-hand side of the cursor slot H in the cursor slot H if the entered key is the right direction key, and then proceeds to step 729.

Menu items are stored in the slots located at the left-hand side and right-hand side of the cursor slot H in step 729. The controller 260 stores menu items in a brother menu of a new menu item in the cursor slot H in the left and right slots and then proceeds to step 731.

At step 731, the controller 260 displays a menu set created through the above steps on the screen. Although the menu display control operation according to the second embodiment of the present invention has been disclosed to include the above step 731 of displaying the menu set on the screen after configuring it completely, it may display a determined menu item on the screen at each step without including the above step 731.

Figure 10A:
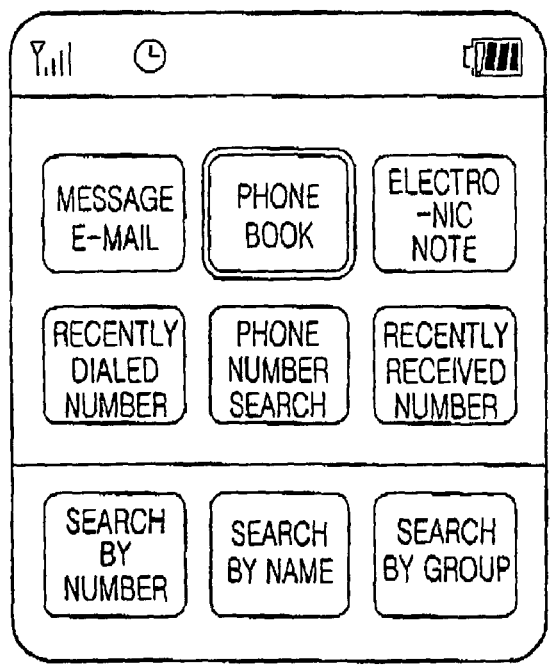
FIGS. 10A and 10B are diagrams of display states of menus on the screen of the mobile communication terminal according to the second embodiment of the present invention.
Figure 10B:
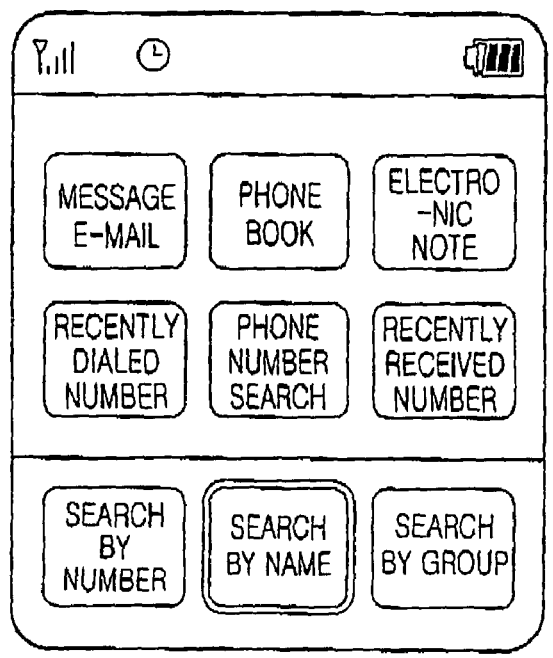

FIGS. 10A and 10B show display states of menus on the screen of the mobile communication terminal according to the second embodiment of the present invention.

Figure 11:
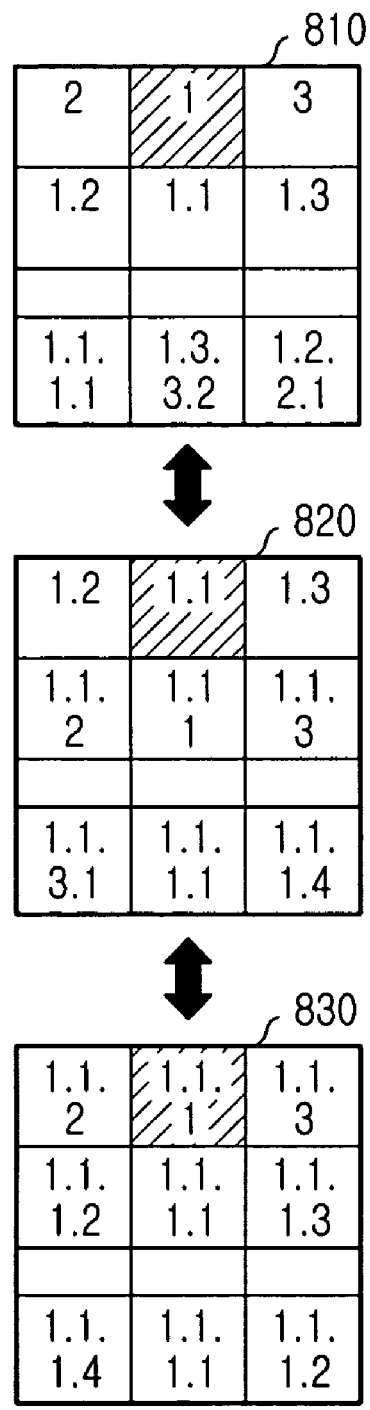
FIG. 11 is a diagram of a menu display method according to a third embodiment of the present invention.

FIG. 11 illustrates a menu display method according to a third embodiment of the present invention. The third embodiment is a modification of the second embodiment and is different from the second embodiment in determining a menu of the third row. Namely, the second embodiment displays the bottom level menu of a menu item in the cursor slot B in the third row, but the third embodiment arranges and displays all menu items in the bottom level menu of the lower-level menu of the menu item in the cursor slot B in the third row according to their priorities. For example, assuming that the priorities of the menu items in the fourth-level menu are defined to be 1.3.3.2>1.1.1.1>1.2.2.1>1.1.3.1>1.1.1.4>1.1.1.2, then MENU SET 810: Since the menu item in the cursor slot B is '1', three higher-priority items among all of the menu items '1.1.1.1' to '1.4.4.4' in the bottom-level menu are displayed in the third row.

MENU SET 820: Since the menu item in the cursor slot B is '1.1', three higher-priority items among all of the menu items '1.1.1.1' to '1.1.4.4' in the bottom-level menu are displayed in the third row.

MENU SET 830: Since the menu item in the cursor slot B is '1.1.1', three higher-priority items among all of the menu items '1.1.1.1' to '1.1.1.4' in the bottom-level menu are displayed in the third row.

Although the detailed description of the invention has been given of the preferred embodiments using the 'row', it will be understood that the present invention may use the 'column'.

As apparent from the above description, the present invention provides a menu display apparatus and method which can display and execute a hierarchical menu on a screen with convenience and efficiency of use increased as follows.

Firstly, the top-level menu and bottom-level menu of the hierarchical menu can be simultaneously displayed in one screen picture. Therefore, a user can reach from an upper-level menu to the bottom-level menu or from the bottom-level menu to the top-level menu with a minimum number of key inputs without passing through intermediate-level menus.

Secondly, a certain menu can be displayed in one screen picture along with the one-level upper menu and one-level lower menu thereof or the one-level lower menu thereof so that the user can readily recognize the position of a current menu.

Thirdly, the user can access all menus using only direction keys.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A menu display apparatus for an electronic device comprising:
    an input unit for moving menu items displayed on a screen of the electronic device;
    a memory for storing a hierarchical user menu and a menu set including a plurality of menu items to be displayed in one screen picture;
    a display for partitioning said screen picture into a plurality of rows and columns and displaying said menu items of said menu set, respectively, in positions defined by the rows and columns; and
    a controller for locating and displaying a selector in a specific position defined by a specific row of the plurality of rows and a specific column of the plurality of columns, and creating a new menu set including menu items belonging to an upper-level menu and lower-level menu of a menu item located in said selector with reference to said hierarchical user menu in said memory upon sensing an input of said input unit.

2. The menu display apparatus as set forth in claim 1, wherein said menu items belonging to said lower-level menu of said menu item in said selector are displayed in said rows located beneath said selector and said menu items belonging to said upper-level menu of said menu item in said selector are displayed in a row of said plurality of rows located above said selector.

3. The menu display apparatus as set forth in claim 1, wherein said menu items belonging to said lower-level menu of said menu item in said selector are displayed in a row of said plurality of rows located beneath said selector and menu items belonging to a bottom-level menu of said menu item in said selector are displayed in a bottom row of said plurality of rows.

4. The menu display apparatus as set forth in claim 2, wherein menu items belonging to a brother menu of said menu item in said selector are displayed in said specific row where said selector is located.

5. The menu display apparatus as set forth in claim 1, wherein a top-level menu of said menu item in said selector is displayed in a row of said plurality of rows located beneath said selector if said menu item in said selector belongs to a bottom-level menu.

6. The menu display apparatus as set forth in claim 1, wherein a bottom-level menu of said menu item in said selector is displayed in a row of said plurality of rows located above said selector if said menu item in said selector belongs to a top-level menu.

7. The menu display apparatus as set forth in claim 1, wherein said menu items are in one-to-one correspondence to respective slots of a plurality of display slots of a n×m matrix and said selector is a cursor slot, said cursor slot being a specific slot selected from said plurality of display slots.

8. The menu display apparatus as set forth in claim 7, wherein said display is adapted to display said screen picture while dividing it into a first part and a second part, said cursor slot being movable between the first part and the second part, said second part being composed of a single row arranged to display a bottom-level menu of a menu item in said cursor slot when said cursor slot is located in said first part.

9. A menu display method for an electronic device, said electronic device including a memory for storing a hierarchical menu and functioning to partition one screen picture into a plurality of rows and columns and to arrange and display menu items, respectively, in a plurality of slots of positions defined by the rows and columns, said slots including one cursor slot, said method comprising the steps of:
  a) determining whether a direction input is sensed;
  b) if the direction input is sensed, creating a menu set by performing the steps of:
    b-1) extracting and storing a specific menu item to be located in said cursor slot with reference to said hierarchical menu;
    b-2) extracting and storing menu items corresponding to a slot of said plurality of slots located at the left-hand side and right-hand side of said cursor slot;
    b-3) if said specific menu item in said cursor slot belongs to a top-level menu, extracting a bottom-level menu of said specific menu item, storing it in a different row of said plurality of rows from a row where said cursor slot is located, extracting a one-level lower menu of said specific menu item and storing it in a second row of said plurality of rows;
    b-4) if said specific menu item in said cursor slot belongs to a bottom-level menu, extracting a top-level menu of said specific menu item, storing it in said different row, extracting a one-level upper menu of said specific menu item and storing it in said second row; and
    b-5) if said specific menu item in said cursor slot belongs to neither the top-level menu nor the bottom-level menu, extracting the one-level upper menu of said specific menu item, storing it in said different row, extracting the one-level lower menu of said specific menu item and storing it in said second row; and
  c) displaying said menu set in said screen picture.

10. The menu display method as set forth in claim 9, wherein said screen picture includes 3 rows and 3 columns, said cursor slot being a central slot of the second row, said different row being the first row, said second row being the third row.

11. A menu display method for an electronic device, said electronic device including a memory for storing a hierarchical menu and functioning to partition a screen picture into a plurality of rows and columns and arrange and display menu items, respectively, in slots of positions defined by the rows and columns, said slots including a cursor slot, said screen picture being displayed while being divided into a first part and a second part, said cursor slot being movable between the first part and the second part, said method comprising the steps of:
  a) determining which of said first part and second part in which said cursor slot is present, according to an input of an input unit;
  b) if said cursor slot is present in said first part, creating a menu set by performing the steps of:
    b-1) extracting and storing a new menu item to be located in said cursor slot with reference to said hierarchical menu according to the input of the input unit if said input of the input unit is not a first directional input, and extracting a bottom-level menu item of an existing menu item located in said cursor slot if said input of the input unit is the first directional input and the existing menu item in said cursor slot belongs to a top-level menu, and extracting a one-level upper menu item of said existing menu item in said cursor slot if said input of the input unit is the first directional input and said existing menu item in said cursor slot does not belong to the top-level menu, and storing the extracted menu item as said new menu item in said cursor slot;
    b-2) extracting and storing menu items corresponding to said slots located at the left-hand side and right-hand side of said cursor slot;
    b-3) extracting a top-level menu of said new menu item in said cursor slot if said new menu item in said cursor slot belongs to a bottom-level menu, and extracting a one-level lower menu of said new menu item in said cursor slot if said new menu item in said cursor slot does not belong to the bottom-level menu, and storing the extracted menu in a row of said plurality of rows subsequent to that where said cursor slot is located; and
    b-4) extracting a bottom-level menu of said new menu item in said cursor slot and storing it in said second part;
  c) if said cursor slot is present in said second part, creating a menu set by performing the steps of:
    c-1) extracting and storing a new menu item to be located in said cursor slot according to the input of the input unit; and
    c-2) extracting and storing menu items corresponding to said slots located at the left-hand side and right-hand side of said cursor slot; and
  d) displaying said menu set created at said step b) or c) in said screen picture.

12. The menu display method as set forth in claim 11, wherein said step b-4) includes the step of selecting a same number of menu items as that of said columns from among all menu items in the bottom-level menu of said new menu item in said cursor slot according to their priorities and storing the selected menu items in said second part.

13. A menu display apparatus for an electronic device, said electronic device including a hierarchical user menu including a plurality of menu items, said apparatus comprising:
  an input unit for selecting the menu items;

a display for partitioning a screen picture into at least three groups of slots for display of the menu items, said slots including a cursor slot; and a controller responsive to an input of said input unit for selecting a specific menu item to be located in said cursor slot and at least an upper-level menu item, at least a lower-level menu item and at least a brother menu item of the specific menu item from said hierarchical menu, and arranging the selected upper-level menu item in a corresponding slot of said plurality of slots of said first group, the selected lower-level menu item in a corresponding slot of said plurality of slots of said second group and the selected brother menu item in a corresponding slot of said plurality of slots of said third group, respectively.

14. The menu display apparatus as set forth in claim 13, wherein said controller is adapted to, if said specific menu item in said cursor slot belongs to a top-level menu, select at least one menu item in a bottom-level menu of said specific menu item and arrange the selected menu item in a corresponding slot of said plurality of slots of said first group.

15. The menu display apparatus as set forth in claim 13, wherein said controller is adapted to, if said specific menu item in said cursor slot belongs to a bottom-level menu, select at least one menu item in a top-level menu of said specific menu item and arrange the selected menu item in a corresponding slot of said plurality of slots of said second group.

16. The menu display apparatus as set forth in claim 14, wherein said slots are defined by rows and columns and said groups are defined by the rows.

17. The menu display apparatus as set forth in claim 15, wherein said slots are defined by rows and columns and said groups are defined by the rows.

18. The menu display apparatus as set forth in claim 16, wherein said slots are defined by three rows and three columns, said cursor slot being located in the second column of the second row, said slots of said first group being located in the first row, said slots of said second group being located in the third row, said slots of said third group being located in the second row.

19. The menu display apparatus as set forth in claim 17, wherein said slots are defined by three rows and three columns, said cursor slot being located in the second column of the second row, said slots of said first group being located in the first row, said slots of said second group being located in the third row, said slots of said third group being located in the second row.

20. The menu display apparatus as set forth in claim 14, wherein said slots are defined by rows and columns and said groups are defined by the columns.

21. The menu display apparatus as set forth in claim 15, wherein said slots are defined by rows and columns and said groups are defined by the columns.

22. The menu display apparatus as set forth in claim 20, wherein said slots are defined by three rows and three columns, said cursor slot being located in the second column of the second row, said slots of said first group being located in the first column, said slots of said second group being located in the third column, said slots of said third group being located in the second column.

23. The menu display apparatus as set forth in claim 21, wherein said slots are defined by three rows and three columns, said cursor slot being located in the second column of the second row, said slots of said first group being located in the first column, said slots of said second group being located in the third column, said slots of said third group being located in the second column.

24. A menu display apparatus for an electronic device, said electronic device including a hierarchical user menu including a plurality of menu items, said apparatus comprising:

an input unit for selecting the menu items;

a display for partitioning one screen picture into at least three groups of slots for display of the menu items, said slots including one cursor slot; and a controller responsive to an input of said input unit for selecting a specific menu item to be located in said cursor slot and at least one lower-level menu item, at least one bottom-level menu item and at least one brother menu item of the specific menu item from said hierarchical menu, and arranging the selected lower-level menu item in a corresponding slot of said plurality of slots of said first group, the selected bottom-level menu item in a corresponding slot of said plurality of slots of said second group and the selected brother menu item in a corresponding slot of said plurality of slots of said third group, respectively.

25. The menu display apparatus as set forth in claim 24, wherein said controller is adapted to, if said specific menu item in said cursor slot belongs to a bottom-level menu, select at least one menu item in a top-level menu of said specific menu item and arrange the selected menu item in a corresponding slot of said plurality of slots of said first group.

26. The menu display apparatus as set forth in claim 25, wherein said display is adapted to display said screen picture while dividing it into a first part including said first and third groups and a second part including said second group, said cursor slot being movable between the first part and the second part, said second part displaying a bottom-level menu of said specific menu item in said cursor slot when said cursor slot is located in said first part.

27. The menu display apparatus as set forth in claim 26, wherein said slots are defined by rows and columns and said groups are defined by the rows.

28. The menu display apparatus as set forth in claim 27, wherein said slots are defined by three rows and three columns, said cursor slot being located in the second column of the first row, said slots of said first group being located in the second row, said slots of said second group being located in the third row, said slots of said third group being located in the first row.

29. The menu display apparatus as set forth in claim 26, wherein said slots are defined by rows and columns and said groups are defined by the columns.

30. The menu display apparatus as set forth in claim 29, wherein said slots are defined by three rows and three columns, said cursor slot being located in the first column of the second row, said slots of said first group being located in the second column, said slots of said second group being located in the third column, said slots of said third group being located in the first column.

31. A menu display method for an electronic device, said electronic device including a memory for storing a hierarchical menu including a plurality of menu items and functioning to partition one screen picture into at least three groups of slots, said slots including at least one cursor slot, said method comprising the steps of:

a) selecting and arranging a specific menu item to be located in said cursor slot with reference to said hierarchical menu in response to an input of an input unit;

b) selecting at least one brother menu item of said specific menu item in said cursor slot;

c) selecting at least one one-level upper menu item and at least one one-level lower menu item of said specific menu item in said cursor slot; and d) arranging the selected one-level upper menu item, one-level lower menu item and brother menu item in said first, second and third groups, respectively.

32. The menu display method as set forth in claim 31, further comprising the step of:
   e) if said specific menu item in said cursor slot belongs to a top-level menu, selecting at least one menu item in a bottom-level menu of said specific menu item and arranging the selected menu item in a corresponding one of said slots of said first group.

33. The menu display method as set forth in claim 31, further comprising the step of:
   e) if said specific menu item in said cursor slot belongs to a bottom-level menu, selecting at least one menu item in a top-level menu of said specific menu item and arranging the selected menu item in a corresponding slot of said plurality of slots of said second group.

34. A menu display method for an electronic device, said electronic device including a memory for storing a hierarchical menu including a plurality of menu items and functioning to partition one screen picture into at least three groups of slots, said slots including one cursor slot, said method comprising the steps of:
   a) selecting and arranging a specific menu item to be located in said cursor slot with reference to said hierarchical menu in response to an input of an input unit;
   b) selecting at least one brother menu item of said specific menu item in said cursor slot;
   c) selecting at least one one-level lower menu item and at least one bottom-level menu item of said specific menu item in said cursor slot; and
   d) arranging the selected one-level lower menu item, bottom-level menu item and brother menu item in said first, second and third groups, respectively.

35. The menu display method as set forth in claim 34, further comprising the step of:
   e) if said specific menu item in said cursor slot belongs to a bottom-level menu, selecting at least one menu item in a top-level menu of said specific menu item and arranging the selected menu item in a corresponding one of said slots of said first group.

36. The menu display method as set forth in claim 34, further comprising the steps of:
   e) if said input of the input unit is a first directional input, determining whether an existing menu item located in said cursor slot belongs to a top-level menu; and
   f) if said existing menu item in said cursor slot belongs to the top-level menu, selecting a bottom-level menu item of said existing menu item and arranging the selected menu item as said specific menu item in said cursor slot.

37. The menu display method as set forth in claim 34, further comprising the steps of:
   e) determining a position of said cursor slot;
   f) if the position of said cursor slot is in said second group, selecting a specific menu item to be located in said cursor slot with reference to said hierarchical menu according to said input of the input unit and arranging the selected menu item in said second group; and
   g) selecting at least one brother menu item of said specific menu item arranged in said second group and arranging the selected menu item in said second group.

* * * * *